United States Patent
Lehto

[11] Patent Number: 5,947,513
[45] Date of Patent: Sep. 7, 1999

[54] PASSENGER RESTRAINT SYSTEM

[76] Inventor: Mark R. Lehto, P.O. Box 2862, West Lafayette, Ind. 47906

[21] Appl. No.: 08/887,918
[22] Filed: Jul. 3, 1997
[51] Int. Cl.$^6$ .................................................. B60R 21/18
[52] U.S. Cl. ........................................ 280/733; 280/730.1
[58] Field of Search ................................ 280/730.1, 733

[56] References Cited

U.S. PATENT DOCUMENTS

| | | | |
|---|---|---|---|
| 3,414,326 | 12/1968 | Raffaelli | 280/733 |
| 3,415,538 | 12/1968 | Radke et al. | 297/481 |
| 3,687,485 | 8/1972 | Campbell | 280/733 |
| 3,753,576 | 8/1973 | Gorman | 280/730.1 |
| 3,836,168 | 9/1974 | Nonaka et al. | 280/733 |
| 3,869,145 | 3/1975 | Takada | 280/733 |
| 3,888,503 | 6/1975 | Hamilton | 280/733 |
| 3,897,961 | 8/1975 | Leising et al. | 280/730.1 |
| 3,942,820 | 3/1976 | Lindblad | 280/733 |
| 3,947,056 | 3/1976 | Schwanz | 280/730.1 |
| 4,536,008 | 8/1985 | Brown, Jr. | 280/730.1 |
| 4,948,168 | 8/1990 | Adomeit et al. | 280/732 |
| 5,226,672 | 7/1993 | Husted | 280/749 |
| 5,288,104 | 2/1994 | Chen | 280/733 |
| 5,346,250 | 9/1994 | Kamiyama | 280/733 |
| 5,385,368 | 1/1995 | Bridge | 280/733 |
| 5,393,091 | 2/1995 | Tanaka et al. | 280/733 |
| 5,465,999 | 11/1995 | Tanaka et al. | 280/733 |

Primary Examiner—Kenneth R. Rice
Attorney, Agent, or Firm—Young & Basile, P.C.

[57] ABSTRACT

A passive inflatable restraining system for a vehicle including a concealed inflatable bag stored in the roof and B-pillar of the vehicle when in the inoperative condition and having one end attached at a central portion of the vehicle and having a second end attached to the B-pillar of the vehicle and further including a sealed tube from the inflatable bag to an inflator concealed at the top of the B-pillar. Upon impact determined by a sensor, the inflator discharges compressed gas through the tube to the inflatable bag which discharges the bag from its concealed portion as it is inflated and projects the inflatable bag over the occupant's head and across his torso in the direction of the dashboard of the vehicle.

15 Claims, 2 Drawing Sheets

PASSENGER RESTRAINT SYSTEM

BACKGROUND OF THE INVENTION

The invention relates to a passive automotive restraining system for protecting occupants of a vehicle during impact. A passive restraint is a device or system designed to provide for the reduction or elimination of injury to occupants of a motor vehicle without requiring any overt action on the part of the occupant. One method of passive protection is to design vehicle interiors (i.e., steering columns, dashboards, and windshields) that safely absorb as much energy as possible. Another method of passive protection is the use and implementation of passive seat belts and air bags. To meet performance requirements of the Federal Government, interior design changes have not provided adequate protection and it has been necessary to provide belts or air bags.

Passive belts automatically move into position when an occupant either first enters a vehicle or as he closes his door. The installation of passive belts was initiated to encourage higher rates of belt use. However, the passive belt system could be disabled in vehicles by simple mechanical means.

Air bag systems provide a passive approach for restraint in a vehicle which is less intrusive and more difficult to disable. Such systems are designed to deploy into position in about 25 milliseconds to protect either the driver or passenger. The current generation of air bags is usually made from a porous nylon material that is inflated by a pyrotechnic inflator that produces nitrogen gas. A driver's side bag is usually about 2.5 cubic feet in volume and is installed in the steering wheel hub. Passenger side bags are generally much larger and are installed in the dashboard in front of the right outboard seating position to protect the passenger. Both passenger and driver's side bags may be used along with knee bolsters to prevent submarining of the occupant and reduce femur loading. Air bags protect occupants substantially in frontal or near frontal crashes of up to speeds of 35 m.p.h. However, they do not offer substantial protection in rear end collisions and their effectiveness in side or angle impacts, or roll overs is questionable. As a result, air bags still require belt usage to achieve good performance in other than frontal crashes.

Air belts are another form of restraint that combine many of the aspects of seat belts and air bags. Air belts consist of an ordinary three point harness, in which the shoulder belt is inflatable. By inflating during an accident, the air belt tightly couples the occupant to the vehicle and spreads the restraining force over a larger area of the torso than does a traditional belt. As with regular seat belts, implementation of air belts require that the belt must be fastened before it has any value. Consequently, in comparison to air bags, air belts fall short in that they do not pose the advantage of being completely passive and non-intrusive.

SUMMARY OF THE INVENTION

It is the intent of the invention to provide a deployable air belt. In doing so, it is intended that the respective advantages of belts and air bags would be combined within a single system. It is further the intent of the invention to provide the deployable air bag so that it is completely non-intrusive and concealed when not deployed. Further, the invention is designed to deploy into position within 35 milliseconds or less.

The concealed air bag is an inflatable passive belt system concealed in the B-pillar and in the headliner of an automobile. The air belt is virtually invisible to the occupants until the car is involved in a severe crash. Then the air belt deploys simultaneously for both driver's side and the passenger's side. The air belt system is designed to inflate between the occupant and the front dash, and in the direction toward the dash. Therefore, the air belt of the current invention does not inflate into the occupant's body.

The concealed air belt is secured in the vehicle by having one end anchored to the floor at the base of the B-pillar and travelling up the B-pillar to the headliner. At the top of the B-pillar, the air belt is folded and travels forward to a point directly in front of the occupant's head. The concealed belt includes an inlet air tube that then travels back to an inflator mounted at the top of the B-pillar slightly rearward from the front seats. The other end of the concealed air belt is anchored to the roof in a central location between the driver and passenger. The headliner fabric hides the inflatable air belt in the roof and along the B-pillar so that it matches the interior of the automobile making it easily incorporated into the interior design.

Other objects, advantages and applications of the present invention will become apparent to those skilled in the art when the following description of the best mode contemplated for practicing the invention is read in conjunction with the accompanying drawings.

DETAILED DESCRIPTION OF THE PREFERRED EMBODIMENT

Figure 1:
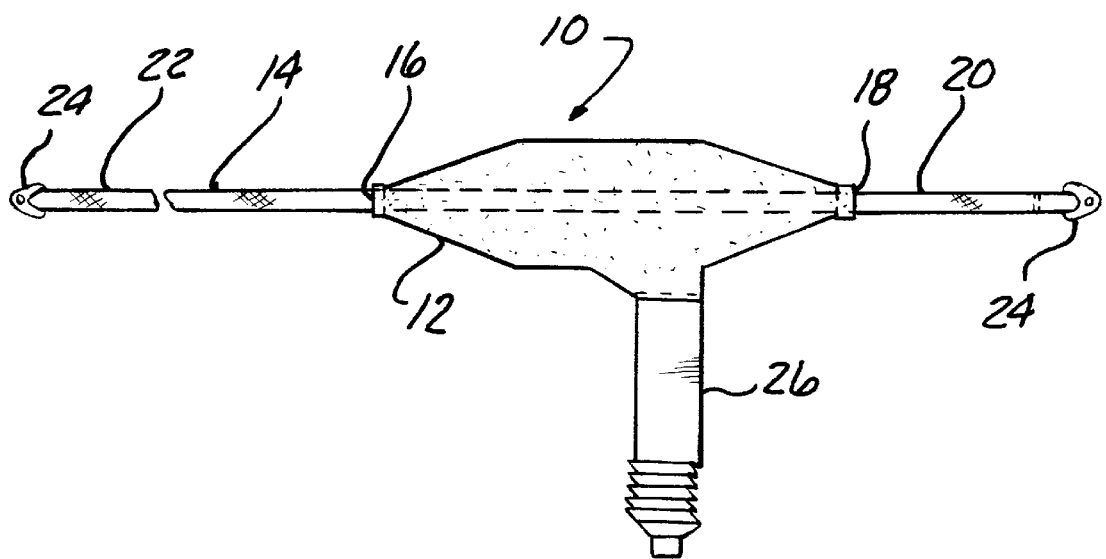
FIG. 1 is a schematic view of an air belt for the passive restraining system according to the present invention.
Figure 4:
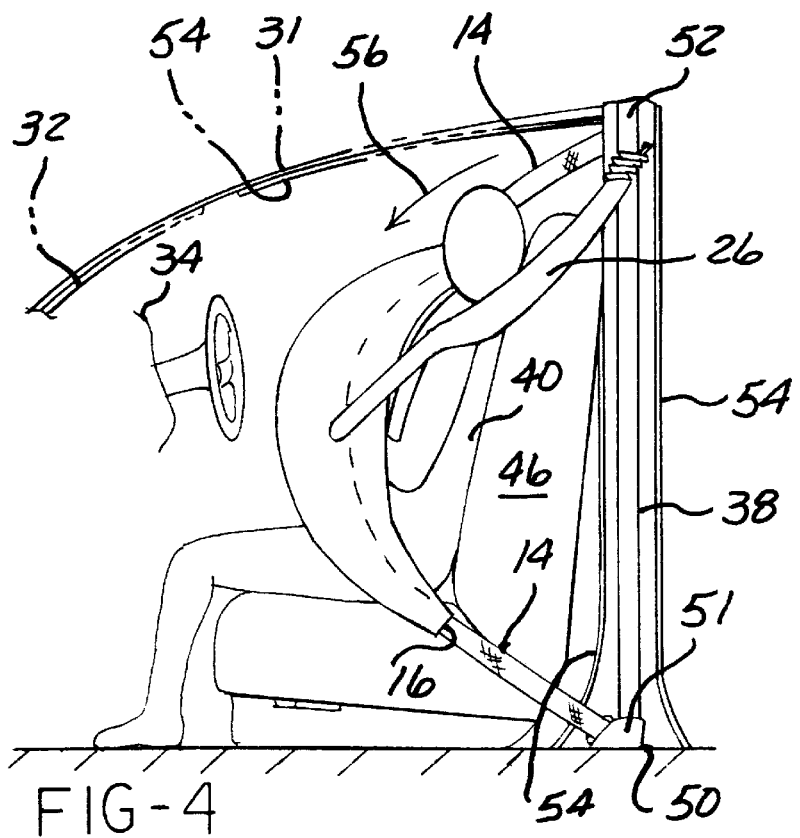
FIG. 4 is a side view of the vehicle showing the air belt in its deployed position.

Looking at FIGS. 1 through 5, there is shown the concealed air belt 10 of the current invention. The concealed air belt 10 comprises an uncoated porus nylon material bag 12 having a general ellipsoidal configuration with a central cylindrical portion that narrows to cone shaped portions at each end. The bag 12 is approximately twenty-four inches long. The cylindrical portion is approximately fifteen inches long and each cone-shaped end portion is approximately eight and a half inches long. The central cylindrical portion has a diameter of approximately ten inches. A nylon belt webbing 14 is threaded through the ends 16 and 18 of the nylon bag 12 such that an exposed shorter end 20 of the belt webbing 14 has a conventional male latching means 24 at its end for securing to the roof of the vehicle. The shorter end 20 of the belt webbing measures approximately twenty inches long, but may vary in length depending upon the model of the vehicle. At the other end 16 of the uncoated nylon bag 12, there is exposed the opposite end 22 of the nylon belt webbing 14 extending a longer portion from the uncoated nylon bag. The length of the longer portion 22 of nylon belt webbing 14 is also determined by the vehicle make and model. The longer end 22 of the nylon belt webbing 14 has a latching means 24 attached thereto. Extending essentially perpendicular from the path of the nylon belt webbing 14, there is a gas inlet tube 26 that is attached to the uncoated nylon bag 12. The gas inlet tube 26 is made of a coated nylon material so that gas is impervious to the tube 26. The gas inlet tube 26 measures approximately forty inches long and four inches diameter. The gas inlet tube 26 provides a path for compressed gas or other inflating means to travel from an inflator source 28 to the uncoated nylon bag. The gas inlet tube 26 is made of a conventional coated nylon material so that during the inflation process no compressed gas can be leaked therefrom before entering the uncoated nylon bag 12.

Figure 2:
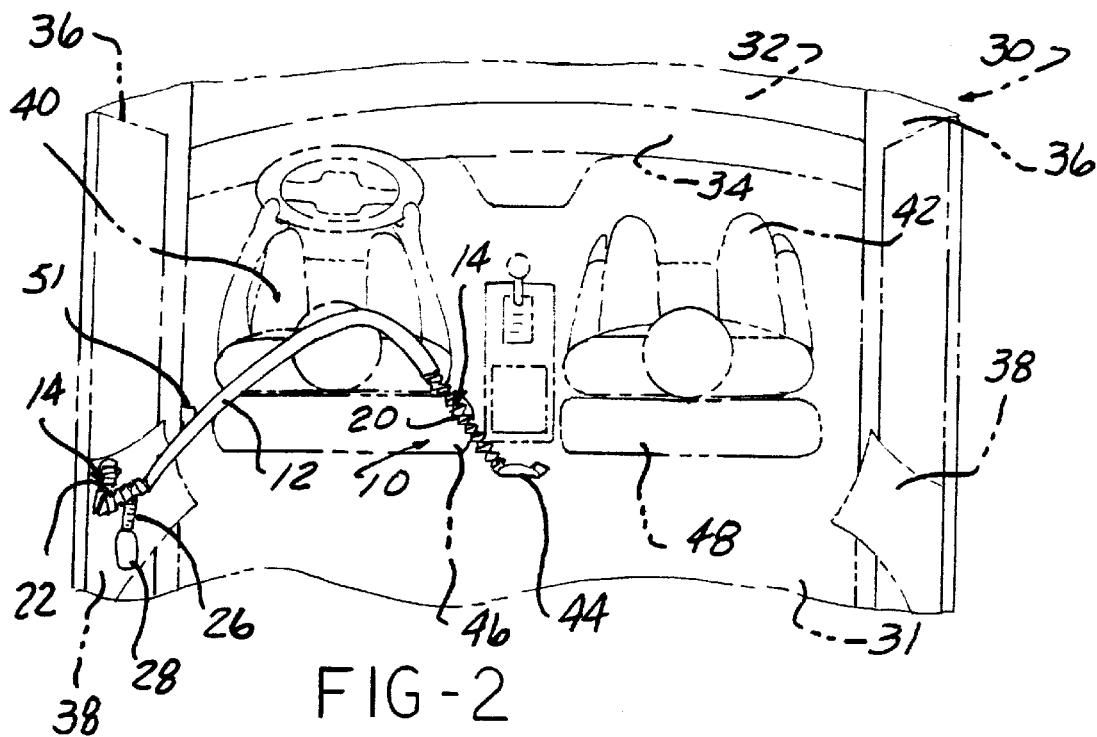
FIG. 2 is an interior view of a vehicle seat equipped with the concealed air belt according to the invention shown in its passive concealed position.
Figure 3:
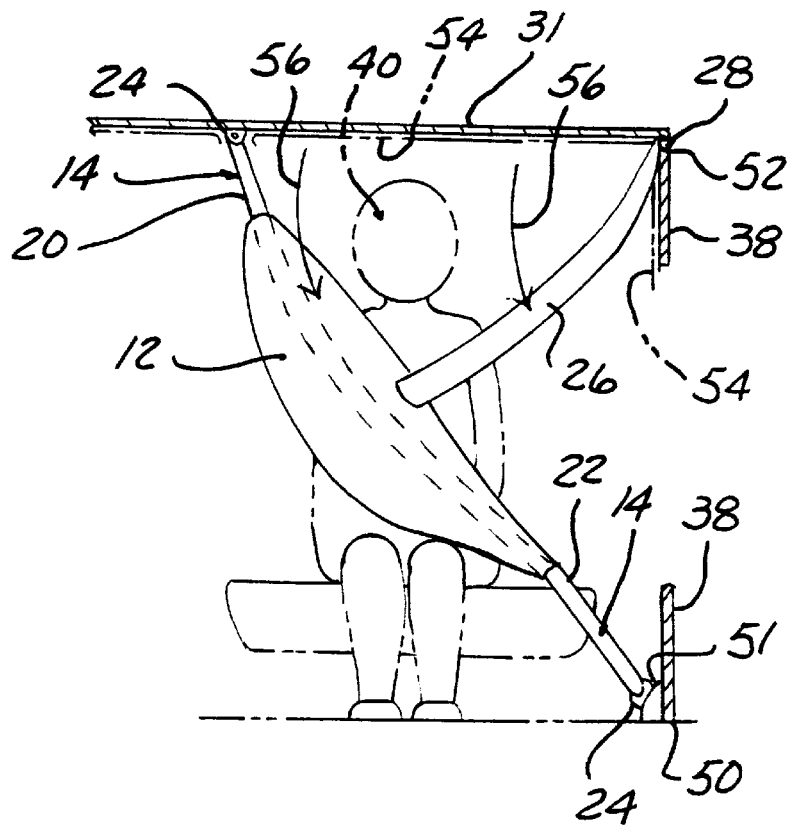
FIG. 3 is a front view of the vehicle seat with the concealed air belt exhibited in its deployed position.

FIG. 2 shows a partial top view of a vehicle 30 and a cutaway roof 31. A typical vehicle 30 will include a front windshield 32, a front dashboard 34, a pair of A-pillars 36 and a pair of B-pillars 38. FIG. 2 further shows the positions of the driver 40 and front passenger 42 relative to the aforementioned elements of the vehicle 30. The passive air belt 10 of the current invention is stored in the passive position, generally in the roof 31 and in the B-pillar 38.

Specifically, the longer end of the nylon belt webbing 14 is anchored to the floor at the base of the B-pillar 50 and travels up the B-pillar 38 to the roof 31. At the base 50 of the B-pillar 38, an anchor for the belt webbing 14 may include a retractor 51 to provide tension on the belt webbing 14. At the top 52 of the B-pillar 38, the air belt 10 travels forward to a point directly in front of the occupant's head which is generally over the seating area. The air bag 12 is folded in the stored position so that it is approximately the same width as the belt webbing 14. The air bag 12 may extend into the B-piller in its concealed position. The concealed belt connected to the short end 20 of the belt webbing 14 travels along the roof line to an anchor 44 between the driver and passenger seats 46 and 48 respectively and approximately a foot behind the front seat backs. The air inlet tube 26 travels along the roof line from the air bag 12 back to the inflator 28 mounted at the top of the B-pillar slightly rearward from the front seats 46 and 48. The air inlet tube 26 is partially folded accordion style to be accommodated in the space at the top 52 of the B-pillar 38. The concealed air belt 10 system is hidden from sight by a thin headliner 54 fabric that matches the interior of the automobile so that it is incorporated into the interior design motif.

In the event of a crash or rapid deceleration of the vehicle, which exceeds a set value, the gas inflator 28 is activated to inflate the air bag 12 and inlet tube 26. The entire air belt system 10 including the air bag 12, belt webbing 14 and gas inlet tube 26 ruptures through the thin headliner material 54 as the air belt system 10 is deployed. The positioning of the concealed air belt system 10 of the present invention in the stored position is such that when the inflator 28 is activated, the belt webbing is analogous to ends of a jump rope. The belt webbing 14 will propel out and over the head and shoulders of the occupant, thereby also propelling the air inlet tube 26 and air bag 12 toward the front windshield 32 and dashboard 34. The direction of the air belt system 10 is shown by arrows 56 in FIGS. 3 and 4. This provides the advantage of not having the air bag 12 inflate into the face of the occupant, which has caused injury with the use of conventional air bags. Instead the subject concealed air belt system acts as a cushion for the occupant by minimizing axial and lateral movement of the occupant.

Extensive testing was conducted to develop the deployment analysis by providing a full-scale concealed air belt simulator. The deployment of the concealed air belt 10 was analyzed using high speed photography. Different bag designs were tested following a sequential testing program in which critical variables influencing both deployment time and concealed air belt positioning were evaluated. The concealed air bag simulator was designed and built including many configurations of a functional concealed air bag. Among many parameters that could be varied were occupant position, anchor mounting locations, inflator location, bag fastening location and pattern, inflator angle, inflator pressure, and belt length.

To enable rapid deployment of the concealed air bag system 10, a convenient means of inflating different bag configurations was required. Although other inflators could be used, a compressed nitrogen system consisting of a pressure vessel and a solenoid shut-off valve was used. Minimum pressure for a proper functioning of the valve was 250 psi. Upon activation by an electric signal, the solenoid valve would cycle in approximately 8 milliseconds to empty the pressure vessel 28 and inflate (thereby deploying) the concealed air bag 12. Tests were performed within a range of 250–500 psi. The location of the pressure vessel 28 and valve assembly within the concealed air bag simulator could be varied fore and aft in two inch increments over a range of 25 inches, between center and B-pillar locations in one inch increments and vertically over a range of 10 inches in one increments. The angle of inflator assembly could also be adjusted.

The concealed air bag simulator allowed both seat position and belt locations to be adjusted. The floor mount could be altered in two inch increments over a range of plus or minus five inches fore and aft relative to the seat. The roof mount could be varied in two inch increments between center and B-pillar locations, and plus or minus five inches fore and aft.

The simulator also included side and roof panels that were constructed from plexiglass in order to allow photography of the concealed air bag deployment from outside the simulator. The side panel was marked with the location of the B-pillar, the windshield, the seat reference point, and the head contour of an occupant. The X, Y, and Z axes were each marked in one inch increments. These markings provided reference points used during the photographic analysis of deployment characteristics.

A testing procedure was followed to design a concealed air belt that would deploy within 35 milliseconds into a position deemed to be optimal for injury prevention for a 50th percentile male sitting in mid-position. Design factors including bag shape, material, folding, volume, and inflation pressure, the predeployment location of the bag and the inflator, and the use of a defuser were considered. The concealed air bag shape, folding, and the use of a defuser were thought to be especially likely to play a significant part in the performance of the concealed air bag. The importance of predeployment location was also considered significant once testing was initiated.

Each prototype of a concealed air bag combined these factors in distinctive ways. After testing certain concealed air bag prototypes, it became clear that certain combinations of the variables had no chance of being optimal. The corresponding concealed air bag prototypes were consequently not considered further. This pruning, guided by the results of earlier tests, allowed for quick development of a feasible prototype.

A passenger side sled buck was modified to correspond closely to the dimensions of the passenger compartment within a typical four-door sedan. A single, bucket seat was installed along with a 12-inch wide B-pillar which duplicated the curve due to the tumblehome of the roof. The provision of a B-pillar allowed the CAB to be mounted and deployed from a concealed position in the simulated interior of the sedan. A fixture representing the dash, constructed out of 1-inch square tubing, was also added. The fixture provided a mounting surface for an inflatable knee bolster. Additional bracing was added to provide for the secure mounting of the concealed air bag stored gas inflator system. Holes were drilled in the B-pillar and overhead frame to provide anchor points for the top and bottom ends of the concealed air bag.

FIG. 1 illustrates the concealed air bag design selected for use during the sled testing. This design was felt to best meet the requirements for successful performance, in terms of shape, materials, configuration, location and inflator specification. As discussed earlier, it consisted of an ellipsoidal bag 12 made from an uncoated material attached to a coated fabric inlet tube 26. The inlet tube 26 is attached to the inflator 28 located at the top of the B-pillar 38. To maximize system reliability, continuous seat belt webbing 14 ran the entire length of the concealed air bag between the ceiling and floor anchor points 44 and 50 respectively and through the center of the inflatable section 12. The concealed air bag was mounted directly over the head of the occupant and down the B-pillar 38.

The crash pulse of a four-door sedan during a 30 mph frontal barrier crash was used for all testing with the sled buck. This crash pulse was chosen to allow assessment of the system's ability to meet the FMVSS 208 requirements and to be within the bound of the best-case test scenario. A Hybrid III Anthropometric Test Device was used to provide 27 channels of data. On board and off board high speed photography was provided as was kinematic analysis.

The concealed air bag was to be deployed into position for four of the five tests; one test was performed using the retractor 51. Several different versions of knee bolsters (not shown) were considered. These included an inflatable knee bolster alone, an inflatable knee bolster supplemented with foam, and foam alone. All tests used a Hybrid III 50th percentile male dummy and a four door body crash pulses for a 30 mph, 0° frontal barrier. The concealed air bag 12 was to be inflated at time zero. The retractor 51, when used, was to be fired with the bolster at 5+20 msec. the tank pressure for the concealed air bag stored gas system was 350 psi for all tests.

Concept feasibility was demonstrated by successful deployment of the concealed air bag 12 from a concealed position for all tested positions of the test Hybrid dummy. HIC values, chest accelerations, and chest compression were all notably low and well within FMVSS 208 reference levels. Although a retractor failed in one test, the test dummy was retained on the seat in every test and was not allowed to impact the windshield. On the other hand, the testing clearly showed that several aspects of the concealed air bag require further consideration. Of particular concern are issues related to the optimal locationization of concealed air bag restraint forces. It appears that occupant positioning, anthropometrics, anchorage locations, slack, and concealed air bag shape are all critical factors.

The concealed air bag system 10 concept feasibility was conclusively demonstrated. Deployment analysis demonstrated that the concealed air bag 12 could be reliably deployed into a satisfactory position in 35 msec or less to ensure the restraint would be in position to protect the occupant. Sled testing demonstrated that the system was able to retain a 50th percentile male anthropomorphic test device in all five 30 mph frontal barrier tests—even with component failure. HIC and chest loading values were notably low. Consequently, a reasonable conclusion is that the potential of the system is great enough to justify continued development. It should be noted that use of a lap belt or a conventional shoulder belt would be recommended to provide further protection to the occupants.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A passive restraint system for a vehicle including a roof, a floor, a front dashboard, a B-pillar and a seat for restricting movement of a passenger in the seat during rapid deceleration from a high impact crash comprising:

an inflatable bag stored in the roof;

belt means attached to opposing ends of said inflatable bag;

a first belt means fixedly secured to the roof and a second belt means fixedly secured to the B-pillar, and inflation means communicating to the inflatable bag for inflating the inflatable bag when deceleration of the vehicle exceeds a predetermined value, said inflatable bag and belt means deployable as a unit when deceleration of the vehicle exceeds the predetermined value.

2. The passive restraint system of claim 1 wherein said inflation means is stored at a top position of the B-pillar and directed toward the front dashboard.

3. The passive restraint system of claim 1, wherein a center portion of the belt means is disposed in the inflatable bag.

4. The passive restraint system of claim 3, wherein the inflatable bag and belt means are deployable in the direction of the front windshield and dashboard when deceleration of the vehicle exceeds the predetermined value.

5. A passive restraint system for a vehicle including a roof, a floor, a front dashboard, a B-pillar and a seat for restricting movement of a passenger in the seat during rapid deceleration from a high impact crash comprising:

an inflatable bag selectively releasably secured to the roof;

belt means attached to opposing ends of said inflatable bag;

a first belt means fixedly secured to the roof and a second belt means fixedly secured to the B-pillar. and inflation means communicating to the inflatable bag when deceleration of the vehicle exceeds a predetermined value wherein the second belt means is fixedly secured to the floor at a bottom position of the B-pillar and stored in the B-pillar.

6. The passive restraining system of claim 5, further including rupturable material covering the roof and B-pillar for concealing the inflatable bag and belt means therein.

7. The passive restraint system of claim 5, wherein the inflatable bag and belt means are deployable as a unit toward the direction of the front windshield and dashboard.

8. In combination with a vehicle including a roof, a floor, a front windshield and dashboard, a B-pillar, and a seat, a concealed occupant restraint system comprising:

an inflatable bag storable in the roof; belt means attached to said inflatable bag and adaptable for anchoring to the roof and floor of the vehicle and stored in said roof and B-pillar;

rupturable material covering the roof and B-pillar for concealing said inflatable bag and belt means; and means, responding to rapid deceleration of the vehicle, for inflating and deploying the inflatable bag through the rupturable material in the direction of the front windshield and dashboard.

9. The system of claim 8, wherein the inflatable bag is stored at a position above the seat.

10. The system of claim 8, wherein the belt means is anchored at one end on the floor adjacent the B-pillar and at the opposing end at a center location of the roof.

11. The system of claim 8, wherein a retractor is located on the floor.

12. The system in claim 8 herein the means for inflating and deploying the inflatable bag includes an inflator stored at an upper end of the B-pillar.

13. The system in claim 12, wherein a coated fabric inlet tube communicates gas from the inflator to the inflatable bag.

14. The system of claim 8, wherein a portion of the belt means is located in the inflatable bag.

15. The system of claim 8, wherein the inflatable bag and belt means are deployable as a unit toward the direction of the front windshield and dashboard.

* * * * *